No. 616,725. Patented Dec. 27, 1898.
H. O'REILLY.
COG WHEEL.
(Application filed Sept. 4, 1897.)
(No Model.)

Witnesses:
Chas. E. Preusgen.
E. Wolff.

Inventor:
Henry O'Reilly
by Hauff + Hauff
his Attorneys.

UNITED STATES PATENT OFFICE.

HENRY O'REILLY, OF DUBLIN, IRELAND.

COG-WHEEL.

SPECIFICATION forming part of Letters Patent No. 616,725, dated December 27, 1898.

Application filed September 4, 1897. Serial No. 650,631. (No model.)

*To all whom it may concern:*

Be it known that I, HENRY O'REILLY, a subject of the Queen of Great Britain and Ireland, and a resident of Dublin, Ireland, have invented an Improved Cog-Wheel, (for which I have obtained a British patent, No. 3,903, dated February 13, 1897,) of which the following is a specification.

My invention relates to improvements in cog-wheels; and the object of my improvement is to provide ball-bearing teeth to lessen the friction, and which cog-wheel can be used as a bicycle-gear or wherever applicable.

This invention is set forth in the following specification and claim and illustrated in the annexed drawings, in which—

Figure 1:
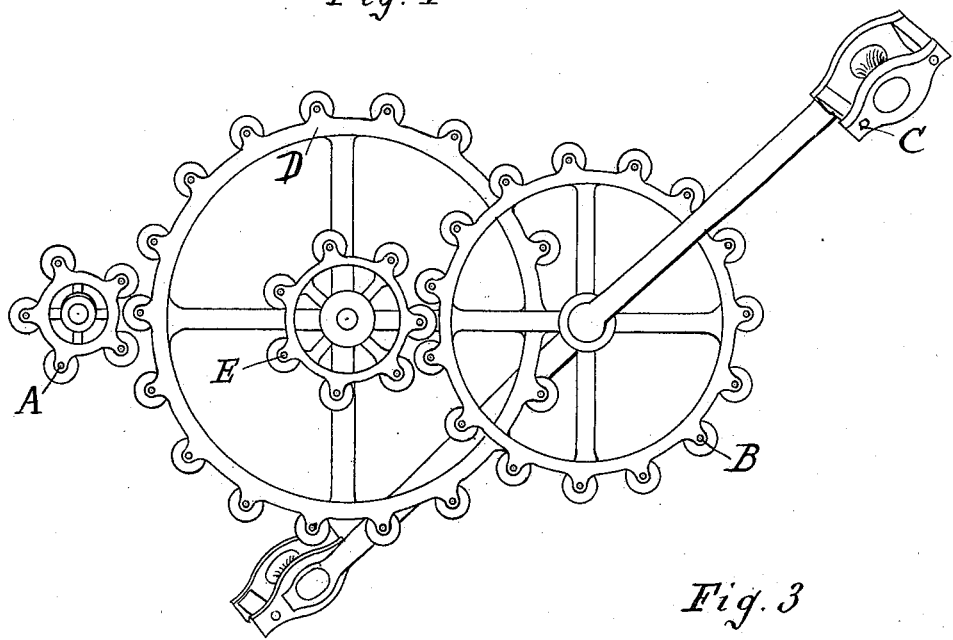
Figure 2:
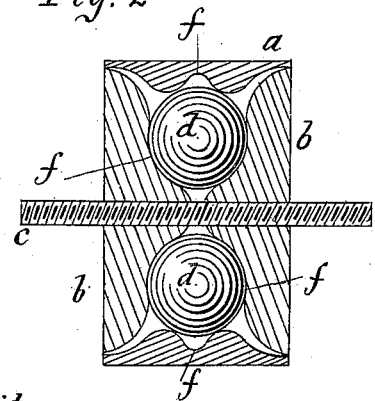
Figure 3:
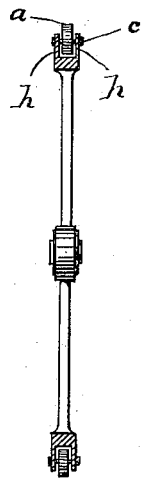

Figure 1 is a side elevation of the cog-wheel. Fig. 2 is a sectional view of a tooth. Fig. 3 shows lugs with a tooth between.

The wheels—as, for example, A or D, as seen in Fig. 3—are provided at the rim or periphery with lugs $h$, in which are fixed or mounted axles $c$ for the roller-teeth. Other wheels B and E are also shown, but all of like construction.

C indicates pedals.

The rollers or teeth are formed by the sections or parts $b$, Fig. 2, which can be screwed or suitably placed upon axle $c$. The rim $a$ surrounds the roller or body-sections $b$. The rim $a$ and sections $b$ have suitably-shaped ball-races $f$ for the reception of the antifriction-balls $d$. These balls when the parts are assembled allow the rim $a$ to turn about body $b$, but prevent the rim slipping or moving laterally out of place. The races $f$ are suitably concaved or shaped to properly seat the balls.

The rim $a$, as seen, is convexed toward the ball $d$, so that the ball-race is completed or inclosed by arcs of circles with their convex surfaces toward the balls, and thus instead of frictional contact all around the circumference of the balls there is contact only at certain points, so as to give free motion to the balls or to diminish friction.

What I claim as new, and desire to secure by Letters Patent, is—

The herein-described bicycle driving-gear, consisting of a toothed wheel having each tooth provided with an axle which is fixed upon lugs on the periphery of the wheel, each tooth comprising two lateral sections mounted upon said axle and provided with opposing concaved faces, balls arranged between said sections and bearing in said concaved faces, and a rim surrounding said sections and provided with convex projections for engagement with said balls, substantially as described.

HENRY O'REILLY.

Witnesses:
J. H. ROBINSON,
A. DONN PIATT.